Jan. 21, 1941.  R. W. WAGNER  2,229,230
SWEEPER STRUCTURE
Filed Feb. 20, 1939    2 Sheets-Sheet 2
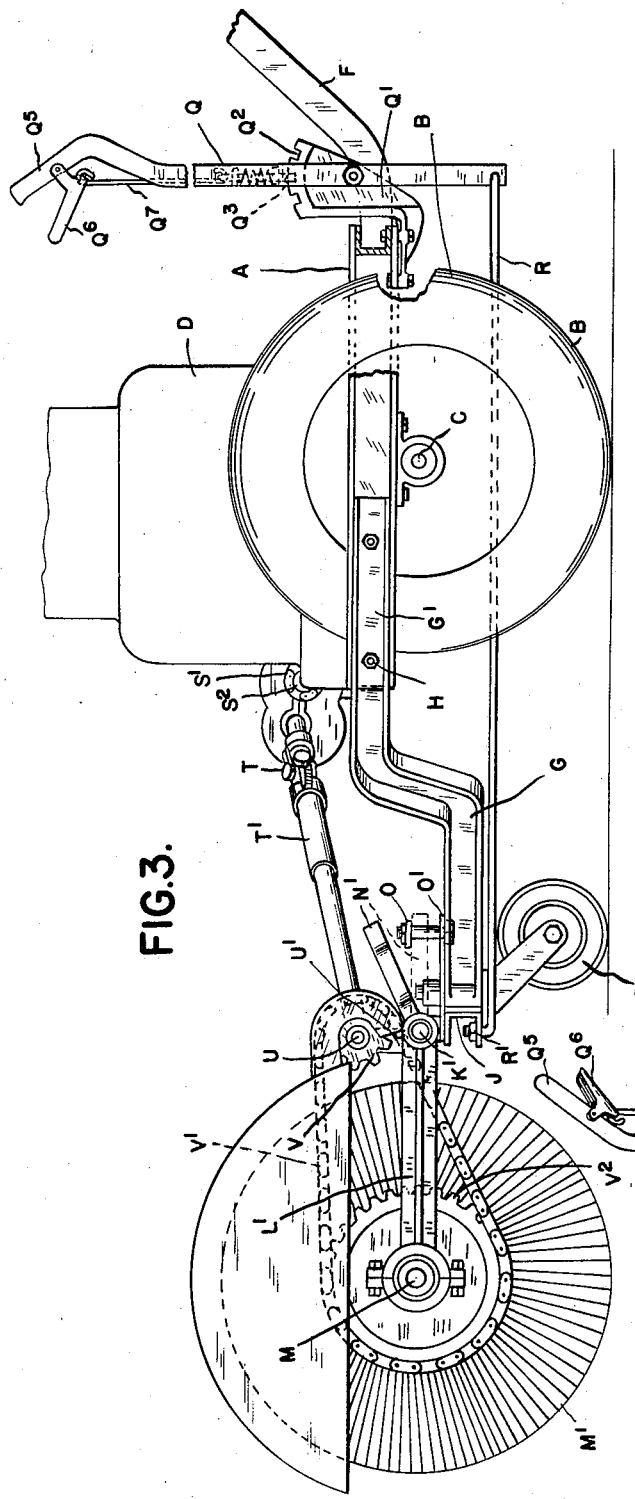
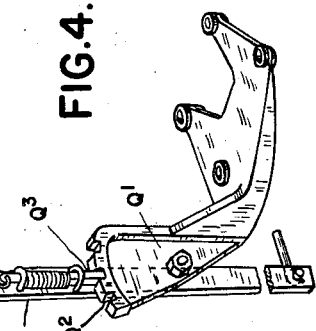
*INVENTOR*
ROBERT W. WAGNER
BY Whittemore Hulbert & Belknap
*ATTORNEYS*

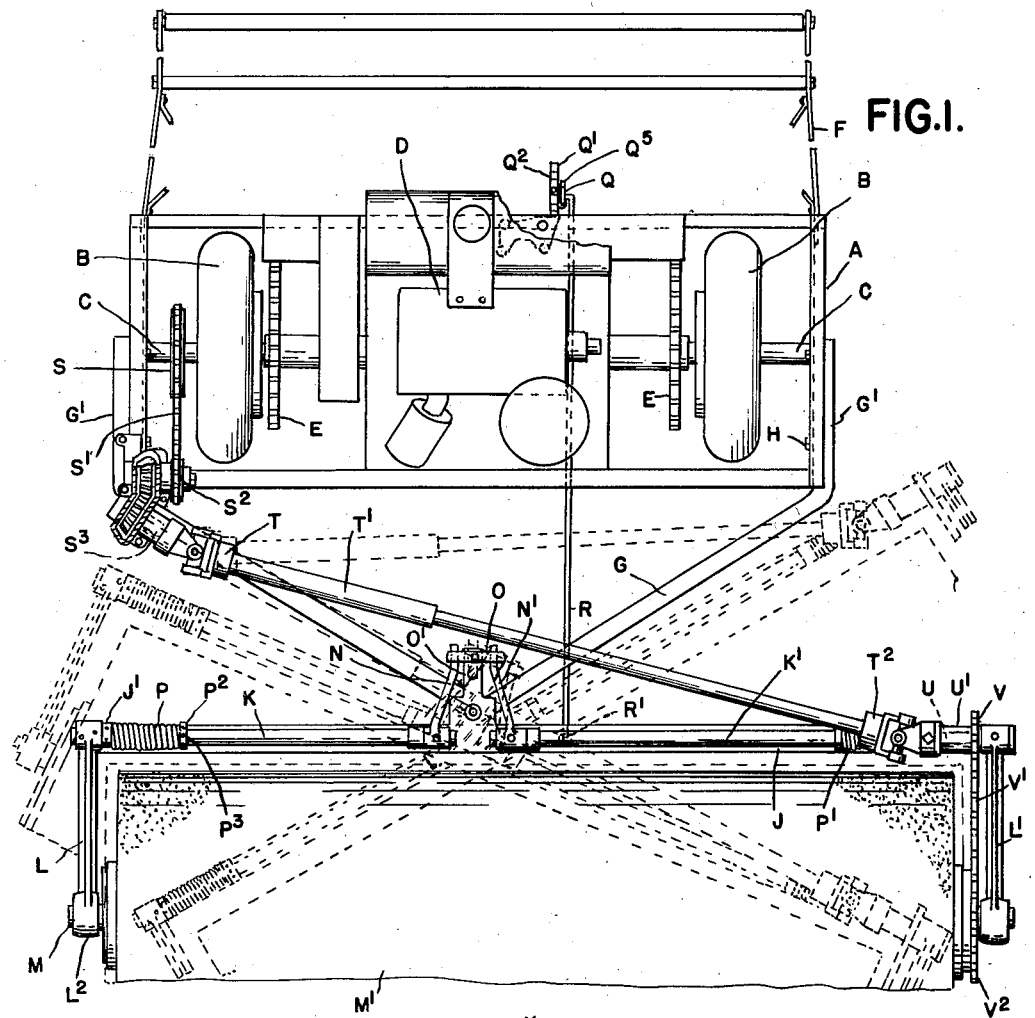
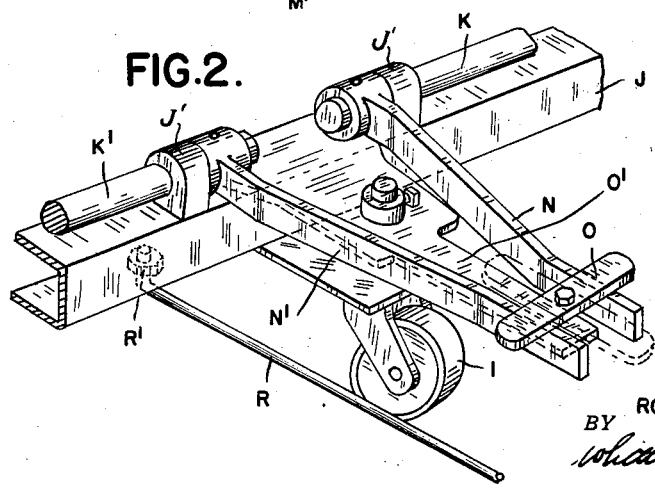

Patented Jan. 21, 1941

2,229,230

UNITED STATES PATENT OFFICE 2,229,230

SWEEPER STRUCTURE

Robert W. Wagner, Detroit, Mich., assignor to Detroit Harvester Company, Detroit, Mich., a corporation of Michigan Application February 20, 1939, Serial No. 257,494

8 Claims. (Cl. 15—82)

This invention relates generally to sweepers, especially to rotary sweepers designed for attachment to wheeled power units, and constitutes a continuation-in-part of my application filed October 31, 1938, bearing Serial No. 238,007. It is the primary object of the invention to obtain a construction which can be easily controlled by the operator to change the direction in which the material is swept relative to the direction in which the machine is traveling and without interfering with the progress of the latter. It is a further object to obtain a construction which permits the sweeper brush to rise and fall differentially at opposite ends thereof so as to conform to an irregular or sloping surface. With these and other objects in view, the invention consists in the construction as hereinafter set forth.

In the drawings:

Figure 1 is a plan view of my improved sweeper attached to the wheeled power unit;

Figure 2 is a perspective view of the means for holding the sweeper brush in raised position;

Figure 3 is a side elevation of the machine;

Figure 4 is a perspective view of the controlling lever and its notched segment.

The wheeled power unit forms no part of the instant invention and, therefore, will only be generally described. It comprises a rectangular frame A preferably formed of channel bars, and which is supported upon ground wheels B mounted on axles C. D is the power unit preferably an internal combustion engine mounted on the frame A. This is provided with suitable transmission mechanism (not fully shown), but including sprocket and chain connections E for driving the ground wheels B. Connected to the frame A and extending rearward therefrom is a handle F, by means of which the operator can guide the direction of travel, and which also forms a mounting for the motor controls (not shown).

The sweeper attachment comprises a substantially V-shaped frame G which extends forward from the frame A and is attached thereto by parallel portions G'. These portions telescopically engage the channels of the frame A and are detachably secured thereto by bolts H. The forward portion of the frame G is depressed into a lower plane and is supported at the apex of the V upon a caster ground wheel I. J is a beam, preferably a channel bar, pivotally attached to the apex of the frame G and extending oppositely therefrom. Mounted on this beam in bearings J' are aligned rockshafts K and K'. At the outer ends of these rockshafts are attached the forwardly extending rock arms L and L', which at their forward ends have journal bearings $L^2$ for the shaft M of a rotary sweeper M'. The inner ends of the rockshafts K and K' are provided with rearwardly extending rock arms N and N', which when depressed will raise the sweeper brush into inoperative position where it is out of contact with the ground. The arms N and N' may be held in this position by a turn-button O, which is pivotally attached to an arm O' secured to and projecting rearwardly from the beam J. Thus, as shown in Figure 2, the button O holds the arms N and N' in depressed position, but by turning this button at right angles to this position, as indicated in dotted lines, the arms N and N' will be released, permitting the brush to be lowered to the ground. Sleeved upon the shafts K and K' adjacent to the outer bearings J' are torsional springs P and P'. One end of each of these springs is anchored to the bearing, while the opposite end is rotatively adjustably secured to the shaft K by a collar $P^2$ and set screw $P^3$. Thus, by adjusting this collar a resilient torque is imparted to the shafts K and K' tending to rock the same so as to lift the arms L and L' and to thereby partially counterbalance the weight of the brush. However, as the shafts K and K' are capable of independent rotation, this will permit a differential movement of the arms L and L', so that if the ground or pavement is higher on one side than the other, the brush will adjust itself thereto.

As the beam J is pivoted to the apex of the V-shaped frame G, said beam can be adjusted angularly into various positions which are oblique with respect to the direction of movement of the machine. This is desirable as in sweeping it is sometimes necessary to direct the material to one side of the path and at other times to direct it to the opposite side. I have, therefore, provided means under the control of the operator for making this adjustment. As shown, this means comprises a lever Q which is pivotally attached to a bracket Q' attached centrally to the rear side of the frame A. The bracket Q' is provided with a notched segment $Q^2$ and a locking bolt $Q^3$ is mounted on the lever Q to alternatively engage the notches of this segment. The upper end of the lever Q forms a handle $Q^5$ which may be grasped by the operator, and an adjacent pivoted lever $Q^6$ connected by a rod $Q^7$ to the bolt $Q^3$ forms a means of operating the latter. The lower end of the lever Q is attached to the bar R which extends forward and is pivotally attached at R' to the beam J at one side of the pivotal mounting of the latter on the frame G. Thus, the operator while guiding the direction of travel of the machine through the handle F, will at the same time be able to adjust the lever Q so as to swing the beam J to one side or the other, and after such adjustment to lock the beam in this position by engagement of the bolt $Q^3$ with one of the notches in the segment $Q^2$.

Rotary motion is imparted to the brush M' through the medium of a transmission mechanism driven by the motor D, and this mechanism is of such a character as not to interfere with the angular adjustment of the beam J, the construction being as follows. Connected to the axle C of one of the ground wheels B is a sprocket S which through a chain S' is connected with a sprocket $S^2$. The latter is connected through the medium of beveled gear wheels mounted on the frame A with a rotary shaft $S^3$. This shaft in turn is connected through the medium of a universal joint T with a telescopic shaft T', the opposite end of which is connected by a universal joint $T^2$ with a rotary shaft U. The shaft U is mounted in a bearing at the upper end of a link U', which is rotatively adjustably secured to the shaft K'. A sprocket V is mounted on the shaft U on the opposite side of said bearing and is connected by a chain V' with a sprocket $V^2$ on the brush shaft. The mechanism just described will transmit rotary motion from the motor to the brush and by reason of the telescopic shaft T' angular adjustment of the beam may be made without interference with this transmission.

A sweeper constructed as above described may be readily attached to or detached from the motor unit so that the latter may be used for various other purposes. When attached, the operator will be able to direct the machine through the handle F, and at any time without stopping the forward movement he can adjust the lever Q so as to change the angle of the brush axis. Also, in traveling over uneven ground or where one side is higher than the other, the brush is permitted to adjust itself thereto. When it is desired to raise the brush into inoperative position the rock arms N and N' are depressed and locked in this position by the turnbutton O.

What I claim as my invention is:

1. A sweeper comprising a wheel supported motor unit including a forwardly extending V-shaped frame, a beam pivotally attached to the apex of said V-shaped frame to be angularly adjustable into different oblique positions, a rotary brush connected to said beam, a handle connected to the rear of said frame for directing the travel of said motor unit, a lever pivotally connected to the rear of said frame, a rod connected to said lever extending forward therefrom and pivotally connected to said beam whereby the rocking of said lever will adjust said beam angularly, and means for locking said lever in different positions of angular adjustment of said beam.

2. A sweeper comprising a wheeled power unit having a frame, a beam pivoted on said frame, independently operable rockshafts mounted on said beam, rock arms extending forwardly from said shafts, a rotary ground-engaging brush carried by said arms, and rock arms extending rearwardly from said shafts and adapted when moved in one direction to raise said brush relative to the ground.

3. A sweeper comprising a wheeled power unit having a frame, a beam pivoted on said frame, independently operable rockshafts mounted on said beam, rock arms extending forwardly from said shafts, a rotary ground-engaging brush carried by said arms, rock arms extending rearwardly from said shafts and adapted when moved in one direction to raise said brush relative to the ground, and means on the frame operable when the brush is raised to lock the rearwardly extending arms.

4. A sweeper comprising a wheeled power unit having a frame, a beam pivoted on said frame, independently operable rockshafts mounted on said beam, rock arms extending forwardly from said shafts, a rotary ground-engaging brush carried by said arms, rock arms extending rearwardly from said shafts and adapted when moved in one direction to raise said brush relative to the ground, and means operable when the brush is raised to hold the rearwardly extending arms, including an arm secured to and projecting rearwardly from said beam, and a manually operable member adjustably connected to the last mentioned arm and engageable with said rearwardly extending arms.

5. A sweeper comprising a wheeled power unit having a frame, a beam pivotally mounted on said frame, bearings on said beam, independently operable rockshafts journaled in said bearings, rock arms extending forwardly from said shafts, a rotary ground-engaging brush carried by said arms, and a coil spring sleeved on each of said rockshafts having one end thereof anchored to one of said bearings and the other end rotatively adjustably connected to the adjacent rockshaft, said springs being torsionally tensioned to partially counterbalance the weight of the brush and to permit differential vertical movement of opposite ends of the brush.

6. A sweeper comprising a motor unit having a frame, a pair of axially aligned motor driven supporting wheels for said frame, a beam pivotally connected to said frame to be angularly adjustable into different oblique positions, a rotary brush in advance of said beam, a connection between said beam and brush permitting differential vertical movement of the opposite ends of the latter, a driving connection between said motor unit and brush operable in all positions of angular adjustment of said beam, means in rear of said motor unit for guiding the direction of travel of the same, and means also in rear of said motor unit for angularly adjusting and locking said beam.

7. A sweeper comprising a motor unit having a frame, a pair of axially aligned motor driven supporting wheels for said frame, a beam pivotally connected to the frame to be angularly adjustable into different oblique positions, a rotary brush in advance of said beam, rock arms extending forward from said beam and connected to said rotary brush, rockshafts connected to said rock arms and extending longitudinally of said beam, rearwardly extending rock arms connected to said rockshafts and adapted when actuated in one direction to raise said brush out of contact with the ground, and means on said frame operable when said brush is raised for simultaneously locking the rearwardly extending rock arms.

8. A sweeper comprising a motor unit having a frame, a pair of motor driven axially aligned wheels for supporting said frame, a beam pivotally connected to the frame to be angularly adjustable into different oblique positions, a rotary brush, rock arms extending forwardly from said beam and connected to said rotary brush, rockshafts connected to said rock arms and extending longitudinally of said beam, and a coil spring sleeved on each of said rockshafts and having one end thereof anchored to said beam and the opposite end thereof rotatively adjustably connected to the adjacent rockshaft, said springs being torsionally tensioned to partially counterbalance the weight of said brush and to permit differential vertical movement of opposite ends of said brush, rearwardly extending rock arms connected to said rockshafts and adapted when actuated in one direction to raise said brush out of contact with the ground, and means for simultaneously engaging both of said rock arms when in a predetermined position to hold the brush in raised position.

ROBERT W. WAGNER.